US012591194B2

(12) United States Patent
Sone

(10) Patent No.: US 12,591,194 B2
(45) Date of Patent: Mar. 31, 2026

(54) HEATING DEVICE AND IMAGE PROCESSING APPARATUS

(71) Applicant: Toshiba Tec Kabushiki Kaisha, Tokyo (JP)

(72) Inventor: Toshihiro Sone, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/665,902

(22) Filed: May 16, 2024

(65) Prior Publication Data

US 2024/0302774 A1 Sep. 12, 2024

Related U.S. Application Data

(63) Continuation of application No. 18/178,479, filed on Mar. 3, 2023, now Pat. No. 12,013,655, which is a continuation of application No. 17/319,574, filed on May 13, 2021, now Pat. No. 11,624,992.

(30) Foreign Application Priority Data

Aug. 3, 2020 (JP) ................................ 2020-131824

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ............ G03G 15/206; G03G 15/2017; G03G 15/2053; G03G 2215/2003
See application file for complete search history.

(56) References Cited

U.S. PATENT DOCUMENTS

| | | | |
|---|---|---|---|
| 6,049,691 | A | 4/2000 | Abe |
| 11,624,992 | B2 | 4/2023 | Sone |
| 2009/0208264 | A1 | 8/2009 | Fujiwara |
| 2010/0290822 | A1 | 11/2010 | Hasegawa |
| 2012/0121304 | A1 | 5/2012 | Tokuda |
| 2013/0195527 | A1 | 8/2013 | Suzuki |
| 2014/0153982 | A1 | 6/2014 | Adachi |
| 2016/0109834 | A1 | 4/2016 | Kadowaki |
| 2017/0102651 | A1 | 4/2017 | Tanaka |

(Continued)

FOREIGN PATENT DOCUMENTS

JP 2019049762 A 3/2019

OTHER PUBLICATIONS

Extended European Search Report dated Dec. 6, 2021, mailed in counterpart European Application No. 21179332.8, 8 pages.

*Primary Examiner* — Thomas S Giampaolo, II
(74) *Attorney, Agent, or Firm* — Kim & Stewart LLP

(57) ABSTRACT

According to an embodiment, a heating device includes a cylindrical belt, a heater, a press roller, and a holder. The heater is disposed on an inner surface of the belt. The press roller rotates and is configured to contact an outer surface of the belt at a position opposite the heater to form a nip. The end portions of the press roller project by a first amount in a radial direction more than the central portion of the press roller. A holder has a first surface supporting the heater to face the cylindrical belt. The holder has a second surface that is opposite of the first surface with a center portion projecting in a direction orthogonal to the first surface more than the end portions of the second surface by a second projection amount that is greater than the first projection amount.

16 Claims, 5 Drawing Sheets

(56) References Cited

U.S. PATENT DOCUMENTS

| | | | |
|---|---|---|---|
| 2019/0286025 | A1 | 9/2019 | Yamaguchi |
| 2020/0183309 | A1 | 6/2020 | Endo |
| 2022/0066364 | A1 | 3/2022 | Sone |
| 2023/0205121 | A1 | 6/2023 | Sone |

FIG. 5

Table 1

| | Press roller CP (µm) | | | | | | | | | |
|---|---|---|---|---|---|---|---|---|---|---|
| | 300 | | 250 | | 200 | | 150 | | 100 | |
| Holder CH (µm) | Crease | Curl | Crease | Curl | Crease | Curl | Crease | Curl | Crease | Curl |
| 650 | A | C | A | B | A | B | B | A | C | A |
| 600 | A | C | A | B | A | A | B | A | C | A |
| 550 | A | C | A | A | A | A | A | A | C | A |
| 500 | A | C | A | A | A | A | A | A | C | A |
| 450 | A | C | A | A | A | A | A | A | C | A |
| 400 | A | C | A | A | A | A | A | A | C | A |
| 350 | A | C | A | A | A | A | A | A | C | A |
| 300 | C | A | A | A | A | A | A | A | C | A |
| 250 | C | A | A | A | A | A | A | A | A | A |
| 200 | C | A | C | A | A | A | A | A | A | A |
| 150 | C | C | C | A | A | A | A | A | A | A |
| 100 | C | C | C | A | C | A | C | A | C | A |
| 50 | C | C | C | A | C | A | C | A | C | A |
| 0 | C | C | C | A | C | A | C | C | C | A |

HEATING DEVICE AND IMAGE PROCESSING APPARATUS

CROSS-REFERENCE TO RELATED APPLICATIONS

This application is a continuation of U.S. patent application Ser. No. 18/178,479, filed on Mar. 3, 2023, which is a continuation of U.S. patent application Ser. No. 17/319,574, filed on May 13, 2021, now U.S. Pat. No. 11,624,992, granted on Apr. 11, 2023, which is based upon and claims the benefit of priority from Japanese Patent Application No. 2020-131824, filed on Aug. 3, 2020, the entire contents of each of which are incorporated herein by reference.

FIELD

Embodiments described herein relate generally to a heating device and an image processing apparatus.

BACKGROUND

An image forming apparatus that prints images on sheets with toner is known. An image forming apparatus of such type includes a fixing device incorporating a heating device. The fixing device heats and presses a toner image on formed on a sheet and thus fixes the toner image to the sheet. When the sheet passes through the fixing device, wrinkles, creases, or the like on the sheet sometimes occur. There is a demand for a fixing device that can avoid or reduce wrinkling and creasing of a printed sheet.

BRIEF DESCRIPTION OF THE DRAWINGS

FIG. 5. provides a table presenting results of an experiment varying holder convexity and press roller convexity.

DETAILED DESCRIPTION

Certain embodiments provide a heating device and an image processing apparatus that can reduce creasing and the like of sheets being printed.

In general, according to an embodiment, a heater includes a cylindrical belt having an axial direction, a heater disposed on an inner surface of the cylindrical belt and having a longitudinal direction parallel to the axial direction, and a press roller. The press roller is configured to contact an outer surface of the cylindrical belt at a position opposite the heater and form a nip. The press roller is configured to rotate to convey a sheet through the nip. Both longitudinal end portions of the press roller project in a radial direction by a first projection amount that is more than a central portion of the press roller between the longitudinal end portions of the press roller in the longitudinal direction. A holder has a first surface supporting the heater and facing the cylindrical belt. The holder has a second surface that is opposite the first surface and has a center portion between the longitudinal end portions of the second surface that projects in a direction orthogonal to the first surface by a second projection amount that is greater than the first projection amount.

Certain examples of a heating device and an image processing apparatus according to an embodiment are explained with reference to the drawings.

Figure 1:
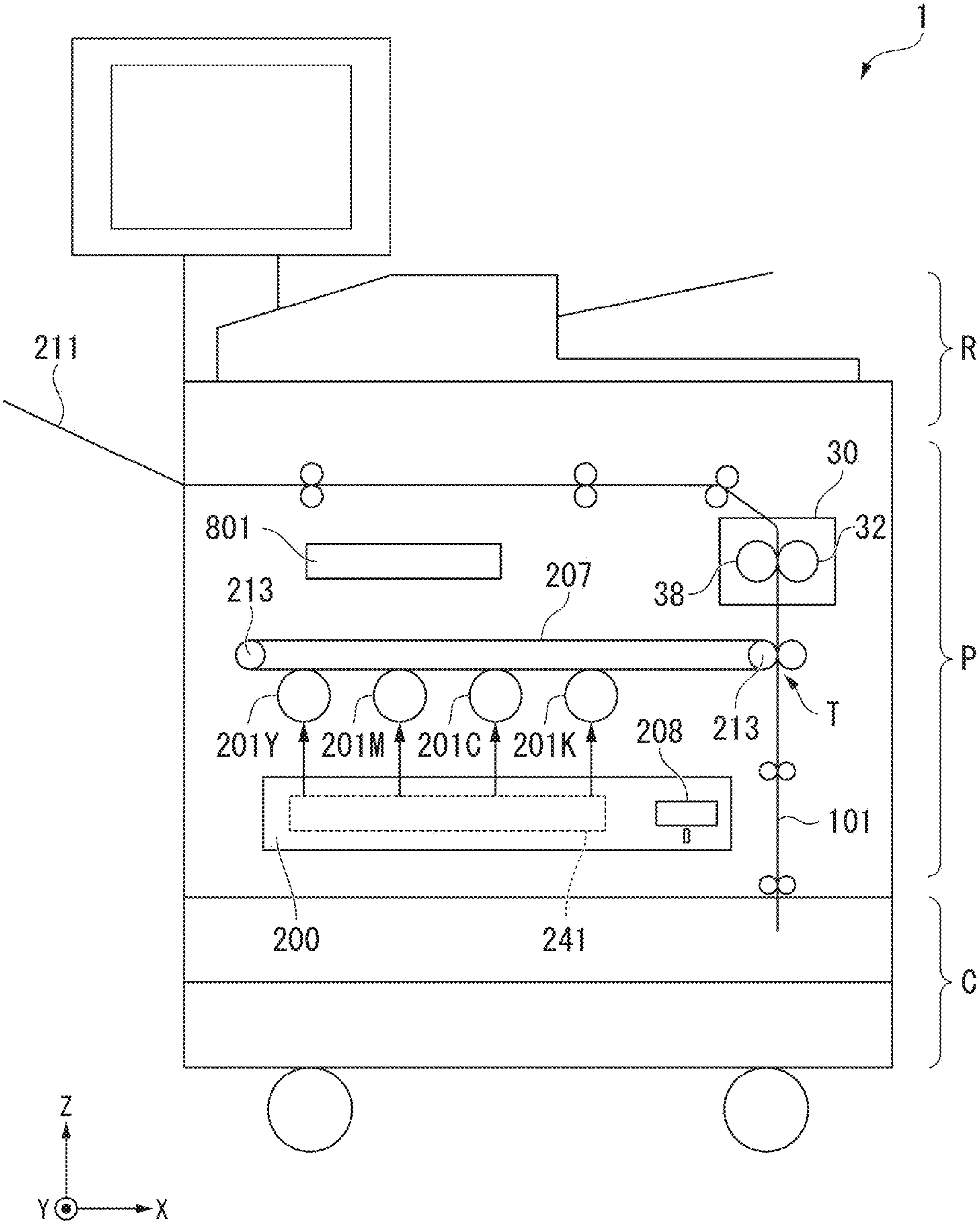
FIG. 1 depicts an image processing apparatus according to an embodiment.

FIG. 1 depicting aspects of an image processing apparatus 1 according to an embodiment. The image forming apparatus 1 performs processing for forming an image on a sheet. The sheet may be paper or the like.

In following description, a Z direction, an X direction, and a Y direction are arbitrarily set for explanatory convenience. The Z direction is the vertical direction in FIG. 1 and the +Z direction is an upward direction. The X direction and the Y direction are the horizontal directions. The X direction is set to be the page width (left-right) direction of the image forming apparatus 1. The +X direction is towards right-hand direction of FIG. 1. The Y direction is the direction into the page of FIG. 1 of the image forming apparatus 1. The +Y direction is a direction outward from the page of FIG. 1.

The image forming apparatus 1 includes a reading unit R, an image forming unit P, and a paper feeding cassette unit C.

The reading unit R reads image information for copying a target object as brightness and darkness of light and generates an image signal accordingly.

The image forming unit P prints an image based on an image signal received from the reading unit R or, alternatively, from an external device. The printed image is an image formed by a toner or another recording material. The image forming unit P in this examples transfers a toner image onto the surface of a sheet. The image forming unit P includes a fixing device 30. The fixing device 30 heats and presses the toner image that has been transferred onto the sheet and thus fixes or fuses the toner image to the sheet.

The image forming unit P in this example includes a laser scanning unit 200 and photoconductive drums 201Y, 201M, 201C, and 201K. The laser scanning unit 200 includes a polygon mirror 208 and an optical system 241. The laser scanning unit 200 selectively irradiates, based on image signals corresponding to the respective colors, the surfaces of the photoconductive drums 201Y, 201M, 201C, and 201K with a laser beam. The laser scanning unit 200 forms electrostatic latent images on the surfaces of the photoconductive drums 201Y, 201M, 201C, and 201K.

The electrostatic latent images on the photoconductive drums 201Y to 201K are developed using respective color toners supplied from a developing device (e.g., toner cartridge). The toner selective adheres to the electrostatic latent images and toner images are thus formed on the photoconductive drums 201Y, 201M, 201C, and 201K. The photoconductive drums 201Y, 201M, 201C, and 201K hold the toner images until the toner images are transferred onto a transfer belt 207. The transfer belt 207 is an endless belt and conveys the transferred toner images to a secondary transfer position T.

A conveyance path 101 connects the paper feeding cassette unit C, the secondary transfer position T, the fixing device 30, and a discharge tray 211. A sheet stocked in the paper feeding cassette unit C can be conveyed to the transfer position T along the conveyance path 101. At the secondary transfer position T, the toner images are transferred from the transfer belt 207 onto the sheet.

The sheet to which the toner images have been transferred is conveyed to the fixing device 30 along the conveyance path 101. The fixing device 30 heats and presses the sheet to fix the toner images to the sheet. After the toner image has been fixed to the sheet, the sheet can be discharged to the discharge tray 211 via the conveyance path 101.

A control unit 801 is a controller that controls various components and mechanisms of the image forming apparatus 1. The control unit 801 includes a central arithmetic unit, such as a CPU (Central Processing Unit), and a volatile and/or nonvolatile storage device (s). The central arithmetic unit executes an arithmetic operations according to a program stored in a storage device, whereby the control unit 801 controls the components and the mechanisms of the image forming apparatus 1. In some examples, some or all of functions of the control unit 801 may be implemented as a dedicated hardware circuit or the like.

Figure 2:
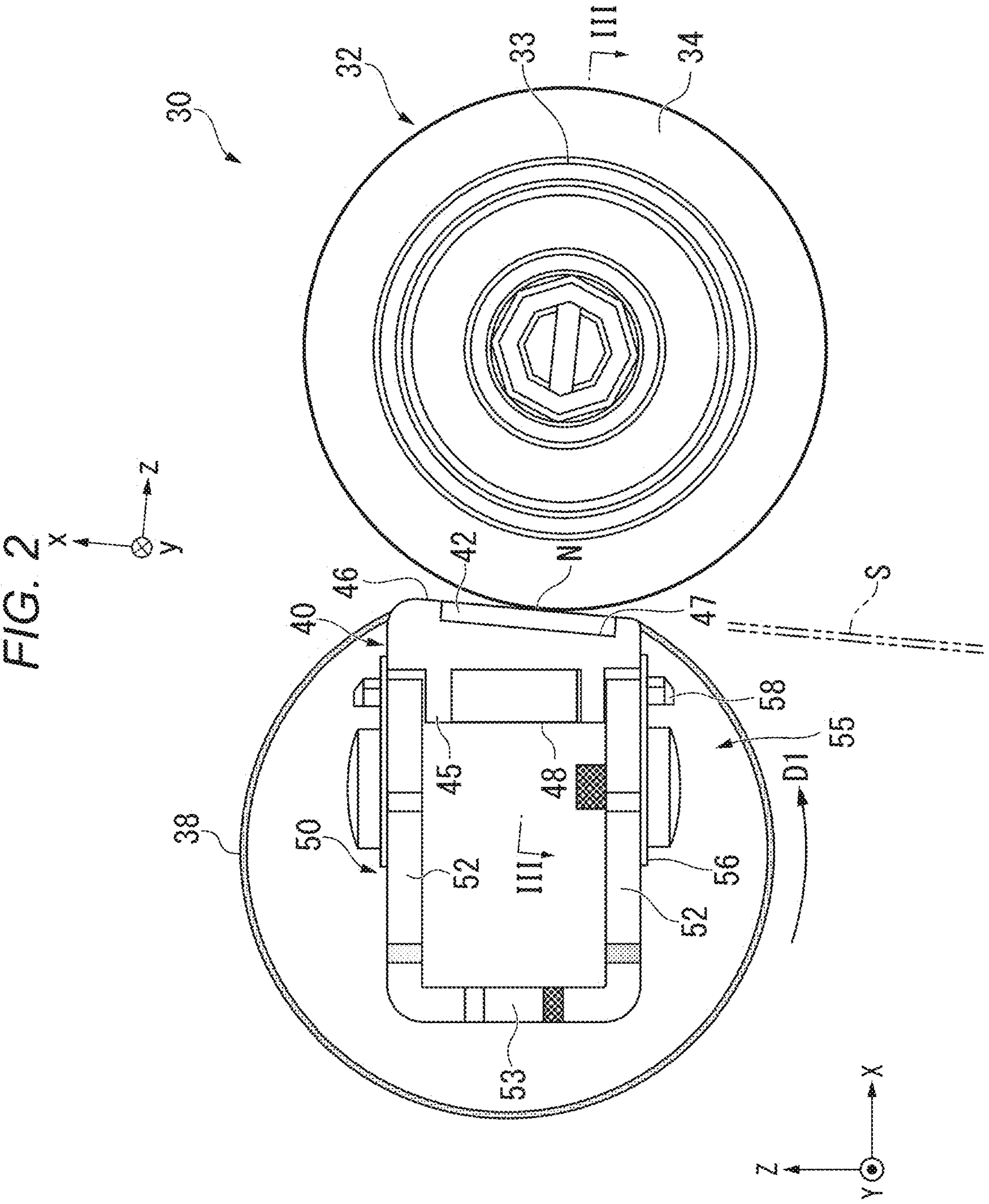
FIG. 2 is a cross-sectional view of a heating device according to an embodiment.

FIG. 2 is a cross-sectional view of fixing device 30. The fixing device 30 is a fixing unit of a so-called "direct heat" type in this example. The fixing device 30 includes a belt 38, a press roller 32, a heating member 40, and a frame 50.

The belt 38 is formed in a tubular or cylindrical shape of a flexible material. The belt 38 can be referred to as endless belt, a fixing belt, a film unit, or the like. The belt 38 includes a base layer, an elastic layer, and a surface release layer. The base layer is made of a thin-film material having high heat resistance. The base layer can be made of a metal material such as nickel or stainless steel, a resin material such as polyimide (PI), or the like. Surface coating or lubricant may be applied to the inner surface of the base layer in order to improve sliding (reduce friction) of the belt 38 against the heating member 40. The elastic layer is made of an elastic material such as silicone rubber. The surface release layer is made of a tetrafluoroethylene/perfluoroalkylvinyl ether copolymer (PFA), polytetrafluoroethylene (PTFE), or the like. The belt 38 is supported by a supporting mechanism on its axial ends (Y direction ends in this description) and is capable of rotating about a central axis parallel to the Y direction.

The press roller 32 is disposed adjacent to the belt 38. The press roller 32 includes a core member 33 and an elastic layer 34. The core member 33 is formed in a columnar shape by metal or the like. Both Y-direction ends of the core member 33 can be supported by a housing or the like of image forming apparatus 1 via a bearing or the like. The core member 33 is capable of rotating around its central axis (Y-direction). The elastic layer 34 is provided on the outer circumferential surface of the core member 33. The elastic layer 34 is formed of a silicone rubber foam, silicone rubber, fluorocarbon rubber, or the like. A release layer (not separately illustrated) may be formed on the outer circumferential surface of the elastic layer 34. PFA, PTFE, or the like can be used in the release layer.

The press roller 32 is pressed against the belt 38 by pressing means to contact with the outer circumferential surface of the belt 38 opposite a heater 42 that is positioned within the interior region formed by the belt. Where the press roller 32 and the belt 38 are in contact, the elastic layer 34 is elastically compressed, whereby a nip N is formed. A sheet S can be held in the nip N and conveyed onward. The nip N has predetermined width in the conveying direction of the sheet S.

The press roller 32 is driven to rotate by a driving source such as a motor. If the press roller 32 rotates, a driving force is transmitted to the belt 38 in the nip N. The belt 38 is rotated in the direction of an arrow D1. The press roller 32 conveys the sheet S by rotating in a state in which the sheet S is placed in the nip N. In the example illustrated in FIG. 2, the conveying direction of the sheet S slightly tilts toward the +X direction away from the Z direction axis.

The heating member 40 is disposed on the inner side of the belt 38. The heating member 40 includes a heater 42 and a holder 45. The heater 42 is formed in a long plate shape.

In the present description, an x direction, a y direction, and a z direction (note lower case usage in this context) are used as directions in a local coordinate system for describing aspects of the fixing device 30. The y direction is the longitudinal direction of the heater 42 and is parallel to the Y direction of the global coordinate system. The x direction is the width (short planar dimension) direction of the heater 42 and the +x direction is the conveying direction of the sheet S (a direction toward the downstream side of the sheet conveyance path). The z direction is the thickness direction of the heater 42 and the +z direction is a direction going towards the press roller 32 from the heater 42 and the −z direction is a direction going away from the press roller 32 towards the heater 42.

The heater 42 is disposed with its longitudinal direction set in parallel to the y direction, the width direction set in parallel to the x direction, and the thickness direction set in parallel to the z direction. The heater 42 includes a resistance film, a substrate, and a protective layer (each not separately illustrated).

The substrate is made of ceramic, stainless steel, or the like.

The resistance film is formed on the +z direction surface of the substrate. The resistance film can be energized to generate heat. The resistance film may be referred to as a resistive heater, a resistive heating element, or the like. The resistance film may be divided into a plurality of resistance elements spaced along the y direction. It may be preferable that the different resistance elements can be energized independently from one another. With independently controllable resistance elements, the temperature of each element can be set independently. Therefore, it can be possible to heat only a particular region through which passes a sheet S of less than full width of the fixing device 30.

The protective layer is provided on the surfaces of the resistance film and the substrate. For example, the protective layer is made of $SiO_2$.

The holder 45 can be made of an elastic material such as silicone rubber or fluorocarbon rubber, heat resistant resin such as polyimide resin, polyphenylene sulfide (PPS), polyether sulphone (PES), or liquid crystal polymer (LCP), or the like. The holder 45 is formed generally in a long plate shape. The heater 42 is disposed on a first surface 46 on the +z direction side of the holder 45. Specifically, a recess 47 is formed in the first surface 46 and the heater 42 is attached to the bottom surface of the recess 47. The longitudinal direction of the first surface 46 is parallel to the y direction. The width direction of the first surface 46 is parallel to the z direction. The direction normal to the first surface 46 is parallel to the +x direction. In the example illustrated in FIG. 2, the thickness of the holder 45 increases from the −z direction side to the +z direction side. The longitudinal direction of a second surface 48 on the −x direction side of the holder 45 is parallel to the Y direction in this example. The width direction of the second surface 48 is parallel to the Z direction of the global coordinate system. The direction normal to the second surface 48 is parallel to the −X direction. The second surface 48 may be parallel to the first surface 46 in some examples.

A heat conductive member with high thermal conductance may be disposed between the bottom surface of the recess 47 and the heater 42. The heat conductive member can be formed of a material having a thermal conductivity higher than the thermal conductivity of the substrate of the heater 42 and the holder 45. For example, the heat conductive member is made of a metal material such as copper or aluminum. A graphite sheet may be adopted as the heat conductive member in some examples. The heat conductive member functions to reduce a possible temperature gradient along the y direction of the belt 38 and the heater 42 and prevent the temperature of the holder 45 from locally exceeding a thermal resistant temperature.

Figure 3:
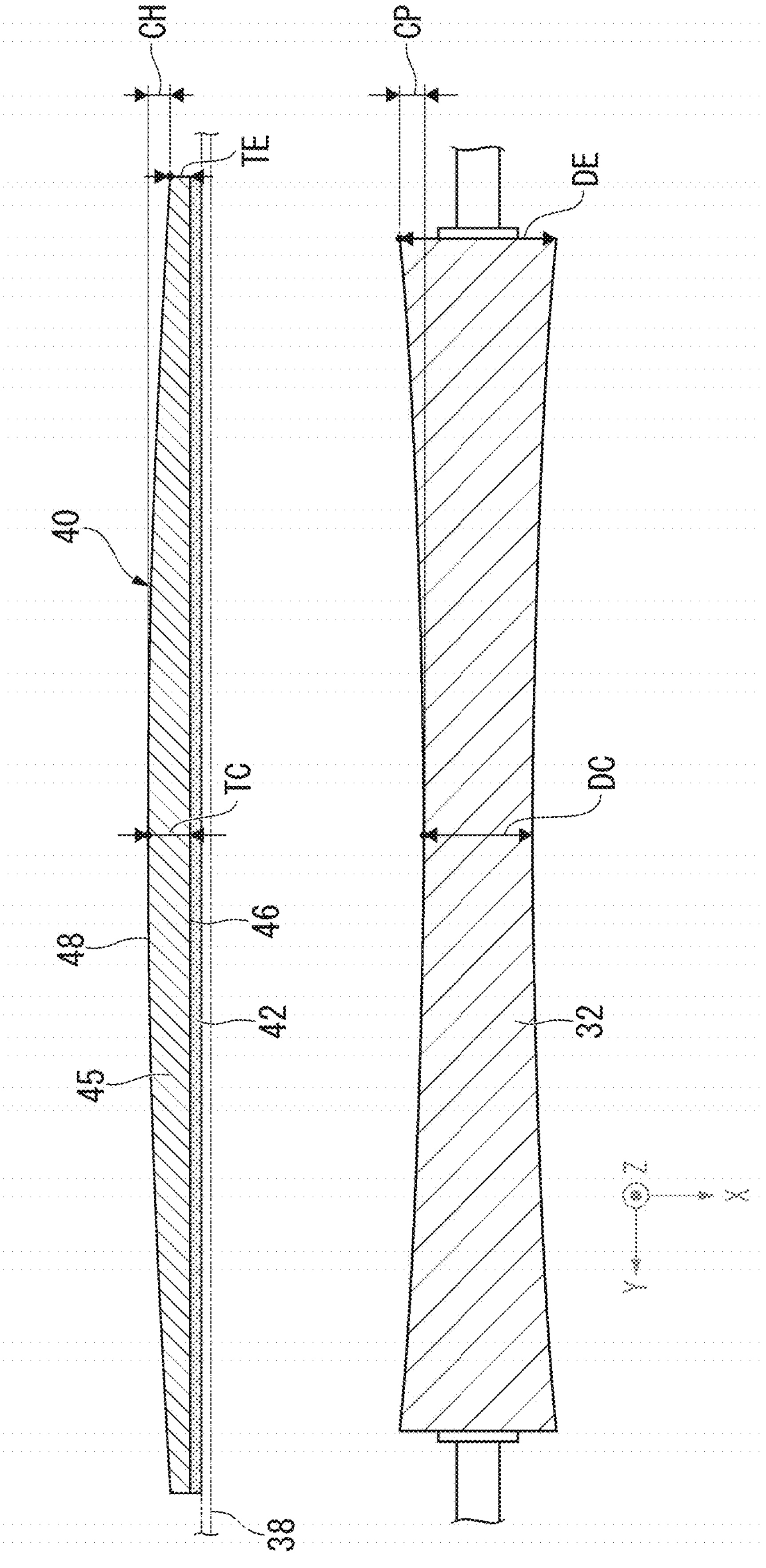
FIG. 3 depicts aspects of a heating member and a press roller.

FIG. 3 depicts a view of heating member 40 and the press roller 32 taken along the III-III line in FIG. 2. The press roller 32 has a concave shape in which both the y-direction end portions (the axial ends) of the press roller 32 project further in the radial direction than the central portion of the press roller 32. That is, a diameter DC of the outer circumference in the central portion of the press roller 32 is less than a diameter DE of the outer circumference of the axial end portions of the press roller 32. A first projection amount CP, which reflects the amount of concavity, for the press roller 32 is represented by the equation: CP=(DE−DC)/2. In FIG. 3, the outer circumferential portion of the press roller 32 has a concaved shape. The concaved shape may be a circular arc shape or may be another curved line shape such as an elliptical arc shape, a parabolic shape, or a hyperbolic shape.

In the heating member 40, the heater 42 is attached on the first surface 46 side of the holder 45. The first surface 46 has a flat planar portion. The second surface 48 of the holder 45 has a convex shape in which the central portion of the second surface 48 along the y direction (between the y-direction ends) projects further in the −X direction than do the y-direction end portions of the second surface 48.

In FIG. 3, thickness TC along the x direction of the holder 45 in the central portion is greater than thickness TE along the x direction of the holder 45 at the y-direction end portions. A second projection amount CH, which reflects the amount convexity, for the second surface 48 of the holder 45 is represented by the equation CH=TC−TE. In FIG. 3, the second surface 48 of the holder 45 has a convexed shape. The convexed shape may be a circular arc shape or may be another curved line shape such as an elliptical arc shape, a parabolic shape, or a hyperbolic shape.

Figure 4:
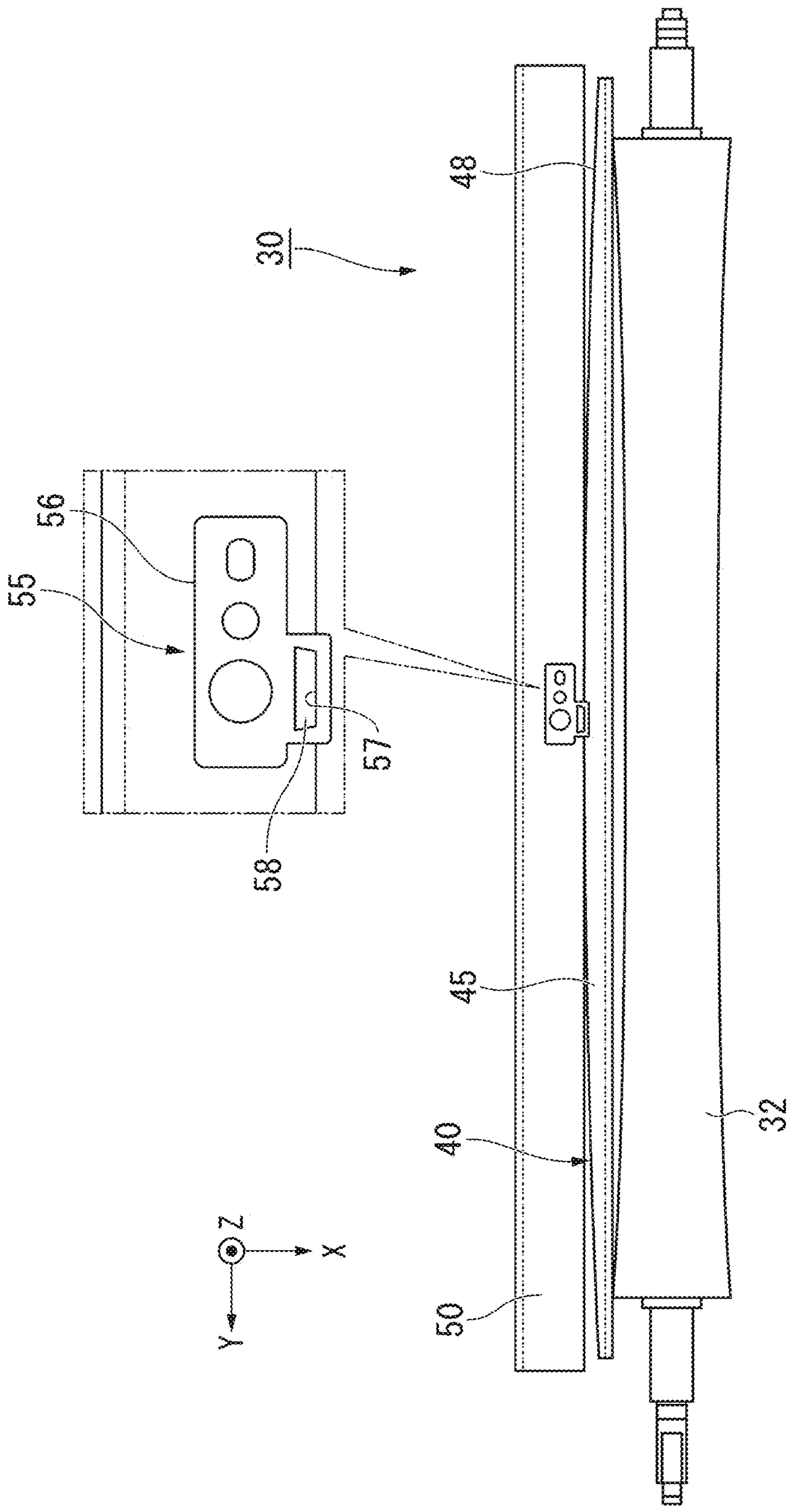
FIG. 4 depicts a fixing device during non-pressurization time.

FIG. 4 depicts a fixing device 30 when the press roller 32 is not being pressed against the heating member 40. In FIG. 4, the belt 38 is omitted from the illustrated.

The frame 50 is disposed on the −X direction side of the heating member 40. The frame 50 is long in the Y direction. The frame 50 is supported by a housing or the like of the image forming apparatus 1 at both the Y-direction ends. As illustrated in FIG. 2, when viewed from the Y direction, the frame 50 has a U shape opening towards the +X direction. In other examples, the frame 50 may have an H shape. The frame 50 includes a coupling section 53 and a pair of supporting sections 52.

The supporting sections 52 are formed in a long plate shape. The supporting sections 52 are disposed with the longitudinal dimension set in parallel to the Y direction, the width dimension set in parallel to the Z direction, and the thickness direction set in parallel to the X direction. The pair of supporting sections 52 is disposed at an interval in the Z direction. The pair of supporting sections 52 is disposed at both the Z direction end portions of the holder 45 (which corresponds to both the x direction end portions in the local coordinate system). The pair of supporting sections 52 supports the holder 45. The coupling section 53 connects the −X direction end portions in the of the pair of supporting sections 52 to each other. The pair of supporting sections 52 and the coupling section 53 may be integrally formed by bending a steel plate material or the like.

As explained above, the press roller 32 comes into contact with the belt 38 on the side opposite of the holder 45 and the heater 42. The press roller 32 forms the nip N with the belt 38. The frame 50 supports the holder 45 at both the z direction end portions. The +z direction is the conveying direction of the sheet S in the nip N. A pressing force acting on the sheet S in the nip N will tend to be larger at the y-direction end portions than in the center portion between the y-direction end portions. Force applied from the center portion towards both the end portions in the y direction acts on the sheet S. The sheet S will be pulled toward both the y direction end portions. Consequently, creases extending in the y direction will less easily occur on the sheet S.

As illustrated in FIG. 4, a positioning mechanism 55 connects the heating member 40 and the frame 50 to one another. The positioning mechanism 55 incorporates a positioning member 56 and a locking claw 58. The positioning member 56 has a locking hole 57 into which the locking claw 58 can be inserted. The positioning member 56 is attached to the pair of supporting sections 52 of the frame 50 near the +X direction ends. The positioning member 56 is at or near the Y direction center of these +X direction ends of the frame 50. The locking claw 58 is formed on the −X direction end side of the holder 40 to be near the Y direction center of the holder 45. The locking claw 58 which is formed on the heating member 40 can be inserted into the locking hole 57 of the positioning member 56. The positioning member 56 is attached to the frame 50. Consequently, the heating member 40 can be positioned with respect to the frame 50 by the engagement of the locking claw 58 with the locking hole 57.

As explained above, the second surface 48 of the holder 45 has a convex shape. As such, at both the Y-direction end portions of the holder 45, there will be a gap left between the frame 50 and the second surface 48 of the holder 45. FIG. 2 also depicts positioning member 56 being on both the Z direction sides of the frame 50 and the holder 45.

A fixing operation of the fixing device 30 is explained.

The press roller 32 illustrated in FIG. 3 is pressed or urged toward the belt 38 by a spring or the like. The press roller 32 comes into contact with the outer circumferential surface of the belt 38 and forms the nip N between the press roller 32 and the belt 38 at a position opposite the heater 42. The sheet S is fed to the nip N. The sheet S in the nip N is conveyed toward the +z direction by rotation of the press roller 32. Toner images on the sheet S are pressed and heated while the sheet S passes through the nip N. Consequently, the toner images are fixed (fused) to the sheet S.

The press roller 32 has a concave shape in which both the y-direction end portions of the press roller 32 project more in the radial direction than the central portion of the press roller 32. A pressing force of the press roller 32 against the sheet S is larger at the end portions than at central portion. Force from the central portion toward both the end portions acts on the sheet S held in the nip N. The sheet S is pulled toward both the end portions. Consequently, creasing along the direction occur less easily on the sheet S.

The holder 45 has a convex in which the central portion of the holder 45 projects further in the x direction (radial direction) than the y direction end portions. If the nip N is formed between the holder 45 and the press roller 32 (which has a concave shape), the width of the nip N can be kept uniform along the y direction. Consequently, fixing performance of the fixing device 30 will be homogeneous along the y direction. The holder 45 has a convex shape on its second surface 48. The first surface 46 is a flat plane. Compared with when the holder 45 has the convex shape on the first surface 46 (on which the heater 42 is disposed), bending deformation of the heater 42 involved in press contact and separation of the press roller 32 is reduced. Since the first surface 46 is a flat plane, bending of the sheet S is avoided. Consequently, if the sheet S is an envelope or the like, creasing can be suppressed.

The holder 45 is supported by the frame 50 in the center of the second surface 48. At both the y-direction end portions in the of the second surface 48, there will be a gap left between the second surface 48 and the frame 50. When the press roller 32 having a concave shape is pressed toward the holder 45, both the y-direction end portions of the press roller 32 will come into contact with the belt 38. By this contacting of these end portions with the belt 38, both the end portions of the holder 45 bend (flex) in the −x direction. If the press roller 32 is further pressed, the entire y direction length of the press roller 32 will come into contact with the belt 38. The nip N is thus formed over the entire y direction length.

The second projection amount CH, which corresponds to the amount convexity, of the holder 45 is greater than the first projection amount CP, which corresponds to the amount of concavity, of the press roller 32 (that is, amount CH>amount CP). Accordingly, both the y-direction end portions of the holder 45 continue to bend toward the −x direction until the y direction center portion of the press roller 32 comes into contact with the belt 38. Since the nip N is formed in along entire y direction length by a small pressing force, an excessive pressing force does not act on the nip N. Consequently, creases of the sheet S can be avoided.

As explained above, since the press roller 32 has a concave shape, creasing of the sheet S is suppressed. However, if the concave amount of the press roller 32 increases, a force pulling the sheet S to both the y direction end portions of the sheet S increases and curls may occur in the sheet S. The convexity of the holder 45 is also considered to contribute to creases and curls of the sheet S. In an experiment, the first projection amount CP of a press roller 32 and the second projection amount CH of a holder 45 were changed and the occurrence of creases and curls was checked. A result of the experiment is illustrated in FIG. 5.

In the Table 1 of FIG. 5, the occurrence of creases and curls is rated as A, B, or C. A rating “A” for creases (in a “Crease” columns) indicates that creases did not occur. A rating “C” for creases (in a “Crease” column) indicates that creases were visually confirmed. A rating “B” for creases (in a “Crease” column) indicates that unevenness cannot be visually seen but can be confirmed by touch. A rating “A” for curls (in a “Curl” column) indicates that a lifting amount of curls is equal to or smaller than a first threshold amount. A rating “B” for curls (in a “Curl” column) indicates that the lifting amount of curls is larger than the first threshold amount but equal to or less than a second threshold amount. A rating “C” for curls (in a “Curl” column) indicates that the lifting amount of curls is larger than the second threshold amount.

As explained above, the second projection amount CH of the holder 45 and the first projection amount CP of the press roller 32 desirably satisfy the relationship CH>CP. In FIG. 5, shading is applied to the evaluation results for which the relationship CH≤CP was satisfied.

The rating C for creases is absent the results for which CH>CP and CP≥150 μm are both satisfied. In the cases of CP≥150 μm, it is thought that an appropriate tensile force acts on the sheets S and creases are suppressed.

All experimental crease results in for which CH>CP, CP≥150 μm, and 550 μm≥CH have the rating A. In the cases of CH≥600 μm, it is considered that the convexity amount of the holder 45 is too large and an appropriate tensile force less easily acts on the sheets S. However, for the cases of 550 μm≥ CH, creases are effectively suppressed.

The rating C for curls is absent for experimental results for which CH>CP and 250 μm≥CP are both satisfied. In the cases of CP=300 μm, it is thought that a tensile force acting on the sheet S is too large and thus curls occur. In the cases of 250 μm≥CP, curls are suppressed.

All experimental results for curls for which CH>CP, 250 μm≥CP, and 550 μm≥CH are met have the rating A. In this case, curls are effectively suppressed.

The rating C for creases and curls is absent for the results satisfying CH>CP and 250 μm≥CP≥150 μm. In these cases, both creases and curls are suppressed.

All experimental results for creases and curls meeting CH>CP, 250 μm≥CP≥150 μm, and 550 μm≥CH have the rating A. In these cases, both creases and curls are effectively suppressed.

As explained above, the fixing device 30 includes a tubular belt 38, a heater 42, a press roller 32, and a holder 45. The heater 42 is disposed on the inner side of the belt 38 and has the axial direction of the belt 38 as its longitudinal direction. The press roller 32 comes into contact with the belt 38 on the opposite side of the heater 42 to form the nip N. The press roller 32 rotates to convey the sheet S held in the nip N. In the press roller 32, both the y direction end portions project in the radial direction by the first projection amount CP more than the y direction center portion in the radial direction. In the holder 45, the first surface 46 (at which the heater 42 is disposed) is in a flat plane. In the holder 45, the y direction center portion on the second surface 48 projects in the −x direction by the second projection amount CH more than both the y direction end portions. The second projection amount CH is greater than the first projection amount CP.

If the press roller 32 having a concave shape is pressed toward the holder 45, both the y-direction end portions of the holder 45 (which has a convex shape) bend toward the −x direction. Since the first projection amount CP is less than the second projection amount CH, both the y-direction end portions of the holder 45 continue to bend in the −x direction until the y direction center portion of the press roller 32 eventually comes into contact with the belt 38. Since the nip N is formed along the entire y direction length by a relatively small press force, an excessive pressing force does not act on the nip N. Consequently, creases of the sheet S can be avoided.

The first projection amount CP is desirably 150 μm or more so that a proper tensile force in the y direction acts on the sheet S and creases of the sheet S are suppressed.

The first projection amount CP is desirably 250 μm or less so that a tensile force in the y direction acting on the sheet S does not become excessive cause the sheet S to curl.

The second projection amount CH is desirably 550 μm or less so that a proper tensile force in the y direction acts on the sheet S and creasing and curling of the sheet S are suppressed.

The fixing device 30 further includes a frame 50 that is disposed on the −x direction side of the holder 45 and supports the holder 45 at both the z direction end portions in the nip N so that a tensile force in the z direction acts on the sheet S and creasing of the sheet S is suppressed.

In the fixing device 30, creasing of the sheet S are suppressed. Therefore, the image forming apparatus 1 has improved image forming quality.

In an embodiment, the image forming apparatus 1 is an image processing apparatus, and fixing device 30 is a heating device. However, in other embodiments, a decoloring apparatus may be the image processing apparatus and a decoloring unit may be the heating device. A decoloring apparatus performs processing associated with a decoloring (erasing) operation on an image previously formed on a sheet using a decolorable toner. The decoloring unit of a decoloring apparatus heats a decolorable toner image on a sheet passing through a nip and thus decolors the toner image.

According to the at least one embodiment explained above, the second projection amount CH (convexity amount) of the holder 45 is greater than the first projection amount CP (concavity amount) of the press roller 32. Consequently, creases in the sheet S can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heating device, comprising:

a cylindrical belt having an axial direction;

a heater disposed on an inner surface of the cylindrical belt and having a longitudinal direction parallel to the axial direction;

a press roller configured to contact an outer surface of the cylindrical belt at a position opposite the heater and form a nip, the press roller being configured to rotate to convey a sheet through the nip, both longitudinal end portions of the press roller having a first diameter in a radial direction of the press roller, a central portion of the press roller between the longitudinal end portions in the longitudinal direction having a second diameter in the radial direction that is less than the first diameter;

a holder having a first surface contacting the heater and facing the cylindrical belt, the holder having a center portion with a first thickness in a direction orthogonal to the first surface, the center portion being between longitudinal end portions of the holder, the longitudinal end portions each being a second thickness in the direction orthogonal to the first surface that is less than the first thickness;

a frame configured to support the holder at both sides of the holder in a conveying direction of the sheet through the nip, the frame being on a second surface side of the holder;

a positioning member attached to an outer surface of the frame at a position near a central portion of the frame between longitudinal end portions of the frame, wherein a locking portion of the positioning member extends beyond the frame in a direction towards the press roller.

2. The heating device according to claim 1, wherein the holder is a rubber material.

3. The heating device according to claim 1, wherein the holder includes an engaging portion configured to engage the locking portion of the positioning member.

4. The heating device according to claim 3, wherein the locking portion includes a hole for engaging the engaging portion of the holder, and the engaging portion includes a locking claw configured to fit within the hole of the locking portion.

5. The heating device according to claim 1, wherein the frame is metal.

6. The heating device according to claim 1, wherein one-half the difference between the first diameter and the second diameter is between 150 μm and 250 μm.

7. The heating device according to claim 6, wherein the difference between the first thickness and the second thickness is 550 μm or less.

8. The heating device according to claim 1, wherein the holder is silicone rubber or fluorocarbon rubber.

9. A sheet processing apparatus, comprising:

a sheet conveying path comprising a plurality of rollers; and a heating device configured to receive a sheet from the sheet conveying path and heat the sheet, the heating device including:

a cylindrical belt having an axial direction;

a heater disposed on an inner surface of the cylindrical belt and having a longitudinal direction parallel to the axial direction;

a press roller configured to contact an outer surface of the cylindrical belt at a position opposite the heater and form a nip, the press roller being configured to rotate to convey a sheet through the nip, both longitudinal end portions of the press roller having a first diameter in a radial direction of the press roller, a central portion of the press roller between the longitudinal end portions in the longitudinal direction having a second diameter in the radial direction that is less than the first diameter;

a holder having a first surface contacting the heater and facing the cylindrical belt, the holder having a center portion with a first thickness in a direction orthogonal to the first surface, the center portion being between longitudinal end portions of the holder, the longitudinal end portions each being a second thickness in the direction orthogonal to the first surface that is less than the first thickness;

a frame configured to support the holder at both sides of the holder in a conveying direction of the sheet through the nip, the frame being on a second surface side of the holder; and a positioning member attached to an outer surface of the frame at a position near a central portion of the frame between longitudinal end portions of the frame, wherein a locking portion of the positioning member extends beyond the frame in a direction towards the press roller, and the holder includes an engaging portion configured to engage the locking portion of the positioning member.

10. The sheet processing apparatus according to claim 9, wherein the holder is a silicone rubber.

11. The sheet processing apparatus according to claim 9, wherein the locking portion includes a hole for engaging the engaging portion of the holder, and the engaging portion includes a locking claw configured to fit within the hole of the locking portion.

12. The sheet processing apparatus according to claim 9, wherein the frame is metal.

13. An image forming apparatus, comprising:

an image forming unit configured to form an image on a sheet; and a fixing device configured to receive the sheet from the image forming unit and heat the image on the sheet, the fixing device including:

a cylindrical belt having an axial direction;

a heater disposed on an inner surface of the cylindrical belt and having a longitudinal direction parallel to the axial direction;

a press roller configured to contact an outer surface of the cylindrical belt at a position opposite the heater and form a nip, the press roller being configured to rotate to convey a sheet through the nip, both longitudinal end portions of the press roller having a first diameter in a radial direction of the press roller, a central portion of the press roller between the longitudinal end portions in the longitudinal direction having a second diameter in the radial direction that is less than the first diameter;

a holder having a first surface contacting the heater and facing the cylindrical belt, the holder having a center portion with a first thickness in a direction orthogonal to the first surface, the center portion being between longitudinal end portions of the holder, the longitudinal end portions each being a second thickness in the direction orthogonal to the first surface that is less than the first thickness;

a metal frame configured to support the holder at both sides of the holder in a conveying direction of the sheet through the nip, the metal frame being on a second surface side of the holder; and a positioning member attached to an outer surface of the metal frame at a position near a central portion of the metal frame between longitudinal end portions of the metal frame, wherein a locking portion of the positioning member extends beyond the metal frame in a direction towards the press roller, and the holder includes an engaging portion configured to engage the locking portion of the positioning member.

14. The image forming apparatus according to claim 13, wherein the locking portion includes a hole for engaging the engaging portion of the holder, and the engaging portion includes a locking claw configured to fit within the hole of the locking portion.

15. The image forming apparatus according to claim 13, wherein the holder is silicone rubber.

16. The image forming apparatus according to claim 13, wherein one-half the difference between the first diameter and the second diameter is between 150 μm and 250 μm, and the difference between the first thickness and the second thickness is 550 μm or less.

* * * * *